United States Patent
Maeda et al.

(10) Patent No.: US 12,304,209 B2
(45) Date of Patent: May 20, 2025

(54) CLEANING FLUID, INK SET, AND CLEANING METHOD

(71) Applicant: SAKATA INX CORPORATION, Osaka (JP)

(72) Inventors: Hirohito Maeda, Osaka (JP); Kazuki Moriyasu, Osaka (JP); Eri Ueda, Osaka (JP); Takaaki Sano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 128 days.

(21) Appl. No.: 18/261,030

(22) PCT Filed: Dec. 14, 2021

(86) PCT No.: PCT/JP2021/045935
§ 371 (c)(1),
(2) Date: Jul. 11, 2023

(87) PCT Pub. No.: WO2022/201667
PCT Pub. Date: Sep. 29, 2022

(65) Prior Publication Data
US 2024/0059067 A1    Feb. 22, 2024

(30) Foreign Application Priority Data

Mar. 23, 2021  (JP) .................. 2021-048159

(51) Int. Cl.
| | | |
|---|---|---|
| *C09D 11/32* | (2014.01) | |
| *B41J 2/165* | (2006.01) | |
| *C11D 1/72* | (2006.01) | |
| *C11D 3/00* | (2006.01) | |
| *C11D 3/28* | (2006.01) | |
| *C11D 3/48* | (2006.01) | |
| *C09D 11/322* | (2014.01) | |

(52) U.S. Cl.
CPC ............. *B41J 2/16552* (2013.01); *C11D 1/72* (2013.01); *C11D 3/0047* (2013.01); *C11D 3/28* (2013.01); *C11D 3/48* (2013.01); *C09D 11/322* (2013.01); *C11D 2111/20* (2024.01)

(58) Field of Classification Search
CPC .......................... B41J 2/16552; C09D 11/322
See application file for complete search history.

(56) References Cited

U.S. PATENT DOCUMENTS

| | | |
|---|---|---|
| 2009/0315942 A1 | 12/2009 | Parazak et al. |
| 2017/0275561 A1 | 9/2017 | Sato et al. |
| 2018/0147851 A1 | 5/2018 | Takaori et al. |
| 2018/0148591 A1 | 5/2018 | Ozawa et al. |
| 2020/0164651 A1 | 5/2020 | Takaori et al. |

FOREIGN PATENT DOCUMENTS

| | | | | |
|---|---|---|---|---|
| EP | 2327746 A1 | 6/2011 | | |
| EP | 2 857 204 A1 | 4/2015 | | |
| EP | 3 354 697 A1 | 8/2018 | | |
| JP | 2011-111527 A | 6/2011 | | |
| JP | 2015-71771 A | 4/2015 | | |
| JP | 2015137318 A | * 7/2015 | ........... | C09D 11/104 |
| JP | 2018-83919 A | 5/2018 | | |
| JP | 2018-87290 A | 6/2018 | | |
| JP | 2018-100341 A | 6/2018 | | |
| JP | 2019-38212 A | 3/2019 | | |
| JP | 2019-43030 A | 3/2019 | | |
| JP | 2020-82577 A | 6/2020 | | |
| JP | 6952208 B1 | * 10/2021 | ........... | C09D 11/107 |
| WO | WO-2015111645 A1 | * 7/2015 | ........... | C09D 11/106 |
| WO | WO 2016/042883 A1 | 3/2016 | | |
| WO | WO 2018/003235 A1 | 1/2018 | | |

OTHER PUBLICATIONS

Supplementary European Search Report in European Patent Application No. 21933259.0 issued on Apr. 26, 2024 in 5 pages.
International Search Report received in PCT/JP2021/045935 mailed Mar. 1, 2022.

* cited by examiner

*Primary Examiner* — Sharon Polk
(74) *Attorney, Agent, or Firm* — KNOBBE, MARTENS, OLSON & BEAR LLP

(57) ABSTRACT

A cleaning fluid used in an ink-jet printer ejecting an aqueous ink-jet ink containing a pigment and an alkali-soluble resin, to clean a portion of the ink-jet printer to which the ejected aqueous ink-jet ink is adherent. The cleaning fluid includes a surfactant, an antiseptic, and water. The surfactant is a compound having a polyoxyalkylene skeleton and an HLB of 9-20, and the antiseptic includes a compound having a hydantoin skeleton, the content of which is 0.05-0.3 mass %. The cleaning fluid does not attack nozzle plates made of silicone and has satisfactory storage stability, antiseptic effect, and ability to remove aqueous ink-jet inks.

7 Claims, No Drawings

CLEANING FLUID, INK SET, AND CLEANING METHOD

This application is the U.S. National Phase under 35 U.S.C. § 371 of International Application PCT/JP2021/045935, filed Dec. 14, 2021, designating the U.S., and published in Japanese as WO 2022/201667 on Sep. 29, 2022, which claims priority to Japanese Patent Application No. 2021-048159, filed Mar. 23, 2021, the entire content of which is incorporated herein by reference.

TECHNICAL FIELD

The present invention relates to a cleaning fluid, an ink set, and a cleaning method.

BACKGROUND ART

In an inkjet printer that ejects an aqueous inkjet ink containing a pigment and an alkali-soluble resin, a cleaning fluid for cleaning a portion to which the ejected aqueous inkjet ink adheres is known (Patent Documents 1 to 6). As the cleaning fluid, a cleaning fluid containing an antiseptic in order to prevent growth of mold and the like (Patent Documents 1 to 2), and a cleaning fluid containing a deliquescent agent such as sorbitol or 1,3-bis(2-hydroxyethyl)-5,5-dimethyl-2,4-imidazolidinedione in order to prevent drying of the cleaning fluid are known (Patent Documents 3 to 6). Further, a nozzle plate having a plurality of ejection ports for ejecting ink is usually provided at a portion for ejecting the aqueous inkjet ink as described above (Patent Document 7).

PRIOR ART DOCUMENTS

Patent Documents

Patent Document 1: WO 2016/042883 A
Patent Document 2: WO 2018/003235 A
Patent Document 3: JP-A-2018-87290
Patent Document 4: JP-A-2018-100341
Patent Document 5: JP-A-2019-38212
Patent Document 6: JP-A-2020-82577
Patent Document 7: JP-A-2011-111527

SUMMARY OF THE INVENTION

Problems to be Solved by the Invention

The surface of the nozzle plate in the inkjet printer as described above usually includes a metal oxide or a nitride in order to prevent erosion by ink. However, when a nozzle plate having a silicon surface is used, the cleaning fluid containing a large amount of a deliquescent agent such as 1,3-bis(2-hydroxyethyl)-5,5-dimethyl-2,4-imidazolidinedione described above has problems that the water repellency of the plate is deteriorated by the cleaning fluid and the storage stability of the cleaning fluid is deteriorated.

The present invention has been made in view of the above circumstances, and an object of the present invention is to provide a cleaning fluid which does not erode a silicon nozzle plate and has good storage stability, an antiseptic effect, and a cleaning property for aqueous inkjet ink.

Means for Solving the Problems

That is, the present invention relates to a cleaning fluid used in an inkjet printer that ejects an aqueous inkjet ink containing a pigment and an alkali-soluble resin, and used for cleaning a portion of the inkjet printer to which the aqueous inkjet ink to be ejected adheres, the cleaning fluid comprising: a surfactant; an antiseptic; and water, wherein the surfactant is a compound having a polyoxyalkylene skeleton and having an HLB of 9 to 20, the antiseptic contains a compound having a hydantoin skeleton, and a proportion of the compound having a hydantoin skeleton in the cleaning fluid is 0.05 to 0.3 mass %.

The present invention also relates to an ink set including the cleaning fluid, and an aqueous inkjet ink containing a pigment and an alkali-soluble resin.

The present invention also relates to a cleaning method for supplying a cleaning fluid to a portion to which an aqueous inkjet ink to be ejected adheres in an inkjet printer that ejects the aqueous inkjet ink containing a pigment and an alkali-soluble resin.

Effect of the Invention

Though the details of the mechanism of action of the effect in the cleaning fluid of the present invention are partially unknown, they are presumed as follows. However, the present invention is not construed as being limited to this mechanism of action.

The cleaning fluid of the present invention contains a surfactant, an antiseptic, and water, wherein the surfactant is a compound having a polyoxyalkylene skeleton and having an HLB of 9 to 20, the antiseptic contains a compound having a hydantoin skeleton, and the proportion of the compound having a hydantoin skeleton in the cleaning fluid is 0.05 to 0.3 mass %. Since the compound having a polyoxyalkylene skeleton and having an HLB of 9 to 20 is excellent in solubility in water, the cleaning fluid of the present invention has good storage stability. In addition, a compound having a specific amount of hydantoin skeleton has low affinity with a silicon-based material unlike a benzisothiazoline-based compound which has been conventionally used as an antiseptic. Therefore, the cleaning fluid of the present invention does not erode a silicon nozzle plate, and has a good antiseptic effect and a cleaning property for an aqueous inkjet ink.

MODE FOR CARRYING OUT THE INVENTION

The cleaning fluid of the present invention is a cleaning fluid used in an inkjet printer that ejects an aqueous inkjet ink containing a pigment and an alkali-soluble resin, and used for cleaning a portion of the inkjet printer to which the aqueous inkjet ink to be ejected adheres, the cleaning fluid comprising: a surfactant; an antiseptic; and water, wherein the surfactant contains a compound having a polyoxyalkylene skeleton and having an HLB of 9 to 20, the antiseptic contains a compound having a hydantoin skeleton, and a proportion of the compound having a hydantoin skeleton in the cleaning fluid is 0.05 to 0.3 mass %.

<Surfactant>

The surfactant is a compound having a polyoxyalkylene skeleton and having an HLB of 9 to 20. Here, the HLB value is an index indicating the degree of hydrophilicity and lipophilicity of surfactant and is calculated by the Griffin's method. The HLB value indicates that the lipophilicity is higher as the HLB value is smaller, and the hydrophilicity is higher as the HLB value is larger. The surfactant can be used singly or in combination of two or more types thereof.

As the compound having a polyoxyalkylene skeleton and having an HLB of 9 to 20, a known surfactant can be used without any particular limitation as long as it has the skeleton and satisfies each HLB value described above. Examples thereof include nonionic surfactants, cationic surfactants, anionic surfactants, and betaine surfactants. Specific examples of the surfactant include silicone-based surfactants, fluorine-based surfactants, and acetylene-based surfactants. Among them, a compound having a polyoxyethylene skeleton is preferable, and a nonionic surfactant, a cationic surfactant, a silicone-based surfactant, and an acetylene-based surfactant are more preferable.

The proportion of the surfactant in the cleaning fluid is preferably 0.05 mass % or more, more preferably 0.1 mass % or more from the viewpoint of securing the cleaning property for inks having various compositions, and is preferably 1 mass % or less, more preferably 0.8 mass % or less from the viewpoint of securing the temporal stability of the cleaning fluid.

<Antiseptic>

The antiseptic contains a compound having a hydantoin skeleton. The compound having a hydantoin skeleton can be used without any particular limitation as long as it has an antiseptic property, and is preferably water-soluble from the viewpoint of being dissolved in the cleaning fluid. Examples of the compound having a hydantoin skeleton include 1,3-bis(2-hydroxyethyl)-5,5-dimethyl-2,4-imidazolidinedione, 1,3-dibromo-5,5-dimethylhydantoin, 1,3-dichloro-5,5-dimethylhydantoin, and bromochloro-5,5-dimethylhydantoin. The antiseptic can be used singly or in combination of two or more types thereof. The above-described "water-soluble" compound is a compound that can be dissolved in an amount of 5 parts by mass or more based on 100 parts by mass of water at 25° C.

The proportion of the compound having a hydantoin skeleton in the cleaning fluid is 0.05 to 0.3 mass %. The proportion of the compound having a hydantoin skeleton in the cleaning fluid is preferably 0.08 mass % or more, more preferably 0.1 mass % or more from the viewpoint of securing a good cleaning property, and is preferably 0.25 mass % or less, more preferably 0.2 mass % or less from the viewpoint of securing the temporal stability of the cleaning fluid.

The antiseptic may further contain an antiseptic other than the compound having a hydantoin skeleton from the viewpoint of enhancing the antiseptic effect. Examples of such an antiseptic include carbamates such as iodopropynyl butylcarbamate; isothiazolines such as 1,2-benzoisothiazolin-3-one; pyrithiones such as sodium pyrithione; and benzimidazoles such as thiabendazole.

The proportion of the water-soluble antiseptic in the cleaning fluid is preferably 0.001 mass % or more, more preferably 0.005 mass % or more from the viewpoint of securing a good cleaning property, and is preferably 0.1 mass % or less, more preferably 0.05 mass % or less from the viewpoint of securing the temporal stability of the cleaning fluid.

The proportion of the antiseptic (the total of the compound having a hydantoin skeleton and the antiseptic other than the compound) in the cleaning fluid is preferably 0.05 mass % or more, more preferably 0.1 mass % or more from the viewpoint of securing a good cleaning property, and is preferably 0.3 mass % or less, more preferably 0.25 mass % or less, still more preferably 0.2 mass % or less from the viewpoint of securing the temporal stability of the cleaning fluid.

<Water>

Examples of the water include ion exchanged water, pure water, distilled water, and industrial water. The water can be used singly or in combination of two or more types thereof.

The proportion of the water in the cleaning fluid is preferably 60 mass % or more, more preferably 70 mass % or more from the viewpoint of reducing the viscosity of the cleaning fluid, and is preferably 99.9 mass % or less, more preferably 99.5 mass % or less from the viewpoint of appropriately containing a cleaning component and the like.

The cleaning fluid may contain a moisturizer from the viewpoint of suppressing moisture evaporation of the cleaning fluid. Examples of the moisturizer include one or more types of mediums selected from the group consisting of a polyalkylene glycol, an alkylene glycol, and glycerin. The moisturizer can be used singly or in combination of two or more types thereof.

Examples of the polyalkylene glycol include polyethylene glycol and polypropylene glycol. Examples of the alkylene glycol include ethylene glycol, propylene glycol, butylene glycol, diethylene glycol, dipropylene glycol, triethylene glycol, tripropylene glycol, 1,2,6-hexanetriol, thiodiglycol, 1,3-butanediol, and 1,5-pentanediol. Among them, the moisturizer is preferably propylene glycol, diethylene glycol, and glycerin from the viewpoint of exhibiting an excellent effect of suppressing moisture evaporation.

When the moisturizer is used, the proportion of the moisturizer in the cleaning fluid is preferably 5 mass % or more, more preferably 10 mass % or more from the viewpoint of securing the moisture retaining property, and is preferably 40 mass % or less, more preferably 30 mass % or less from the viewpoint of securing the temporal stability of the cleaning fluid.

The cleaning fluid may contain a pH adjuster. Examples of the pH adjuster include alcohol amines such as diethanolamine, triethanolamine, and 2-amino-2-ethyl-1,3-propanediol; alkali metal hydroxides such as lithium hydroxide, sodium hydroxide, and potassium hydroxide; ammonium hydroxides such as ammonium hydroxide and quaternary ammonium hydroxide; phosphonium hydroxides, and alkali metal carbonates.

The pH of the cleaning fluid is preferably 5 or more, more preferably 6 or more from the viewpoint of preventing rust of the printer member, and is preferably 12 or less, more preferably 9 or less from the viewpoint of preventing corrosion of a portion of the printer to which the ink adheres.

The cleaning fluid may contain an organic solvent, an antifoaming agent, and the like as necessary. Note that the blending amount of the organic solvent that may erode the member of the aqueous inkjet printer is preferably limited so as not to erode the member, and more preferably, no organic solvent is blended.

The method for preparing the cleaning fluid is not particularly limited, and the cleaning fluid may be prepared as one agent by mixing all the components, or may be prepared as two agents so as to separately supply the cleaning fluid to a portion to which the aqueous inkjet ink adheres, as described later.

The viscosity of the cleaning fluid is only required to be 5 cps or less at 25° C., and is preferably in a range of 1 to 3 cps. The viscosity can be measured with, for example, an E-type viscometer (trade name "RE100L type viscometer" manufactured by Toki Sangyo Co., Ltd.).

<Ink Set>

The ink set of the present invention includes the cleaning fluid, and an aqueous inkjet ink containing a pigment and an alkali-soluble resin.

<Pigment>

As the pigment, organic pigments and inorganic pigments used in aqueous inkjet inks can be used without any particular limitation. Examples of the organic pigment include dye lake pigments, azo-based pigments, benzimidazolone-based pigments, phthalocyanine-based pigments, quinacridone-based pigments, anthraquinone-based pigments, dioxazine-based pigments, indigo-based pigments, thioindico-based pigments, perylene-based pigments, perinone-based pigments, diketopyrrolopyrrole-based pigments, isoindolinone-based pigments, nitro-based pigments, nitroso-based pigments, flavanthrone-based pigments, quinophthalone-based pigments, pyranthrone-based pigments, and indanthrone-based pigments. Examples of the inorganic pigment include carbon black, titanium oxide, zinc oxide, red iron oxide, graphite, black iron oxide, chrome oxide green, and aluminum hydroxide. The pigment may be subjected to a surface treatment using a known surface treatment agent. The pigments can be used singly or in combination of two or more types thereof.

<Alkali-Soluble Resin>

The alkali-soluble resin is an ordinary alkali-soluble resin that can be used for pigment dispersion of inks and paints or as a binder, and is not particularly limited as long as the alkali-soluble resin can be dissolved in an aqueous medium in the presence of a basic compound. The alkali-soluble resin is preferably a resin containing one type or two or more types of anionic groups such as a carboxyl group, a sulfonic acid group, and a phosphonic acid group ($-P(=O)(OH_2)$).

The alkali-soluble resin preferably further has a hydrophobic moiety for improving the adsorption mainly on the pigment in the molecule. Examples of the hydrophobic moiety introduced into the molecule include hydrophobic groups such as a long-chain alkyl group and an alicyclic or aromatic cyclic hydrocarbon group.

The acid value of the alkali-soluble resin is preferably 40 mg KOH/g or more, and more preferably 70 mg KOH/g or more from the viewpoint of increasing the solubility in an aqueous medium. The acid value of the alkali-soluble resin is preferably 300 mg KOH/g or less, more preferably 250 mg KOH/g or less from the viewpoint of improving the water resistance of a printed matter. The acid value is a theoretical acid value of the mg number of potassium hydroxide theoretically required to neutralize 1 g of alkali-soluble resin, which is arithmetically determined based on the composition of the monomer used for synthesizing the alkali-soluble resin.

The glass transition temperature of the alkali-soluble resin is preferably 0° C. or more, more preferably 10° C. or more from the viewpoint of improving the blocking resistance of a printed matter. The glass transition temperature of the alkali-soluble resin is preferably 100° C. or less, more preferably 80° C. or less from the viewpoint of improving the folding resistance of a printed matter.

The glass transition temperature of the alkali-soluble resin is a theoretical glass transition temperature determined by the following Wood equation when the alkali-soluble resin is an acrylic copolymer resin.

Wood equation: $1/Tg = W1/Tg1 + W2/Tg2 + W3/Tg3 + \ldots + Wx/Tgx$

[where, $Tg1$ to $Tgx$ represent the glass transition temperature of homopolymer of each of the monomers 1, 2, 3 . . . x that constitute the alkali-soluble resin, W1 to Wx represent the polymerization fraction of each of the monomers 1, 2, 3 . . . x, and Tg represents the theoretical glass transition temperature. Provided that, the glass transition temperature in the Wood equation is the absolute temperature.]

The glass transition temperature of the alkali-soluble resin is a theoretical glass transition temperature determined by thermal analysis when the alkali-soluble resin is a resin other than the acrylic copolymer resin. As the method of thermal analysis, as an example, the glass transition temperature can be measured in conformity with JIS K7121 (Testing Methods for Transition Temperatures of Plastics) using Pyrisl DSC manufactured by PerkinElmer Co., Ltd. under the conditions of a rate of temperature rise of 20° C./min and a nitrogen gas flow rate of 20 ml/min.

The weight average molecular weight of the alkali-soluble resin is preferably 5,000 or more, more preferably 10,000 or more from the viewpoint of improving the water resistance of a printed matter. The weight average molecular weight of the alkali-soluble resin is preferably 100,000 or less, more preferably 50,000 or less from the viewpoint of increasing the solubility in an aqueous medium.

The weight average molecular weight can be measured by the gel permeation chromatography (GPC). As an example, the weight average molecular weight in terms of polystyrene can be determined by performing chromatography using Water 2690 (manufactured by Waters Corporation) as a GPC instrument, and PLgel, 5μ, and MIXED-D (manufactured by Polymer Laboratories Inc.) as a column under the conditions of a tetrahydrofuran as a developing solvent, a column temperature of 25° C., a flow rate of 1 ml/min, an RI detector, a sample injection concentration of 10 mg/ml, and an injection volume of 100 μl.

Examples of the alkali-soluble resin include acrylic copolymer resins, maleic acid-based copolymer resins, polyester resins obtained by condensation polymerization reaction, and polyurethane-based resins. Materials for synthesizing such alkali-soluble resins are disclosed, for example, in JP-A-2000-94825, and it is possible to use an acrylic copolymer resin, a maleic acid-based copolymer resin, a polyester-based resin, a polyurethane-based resin and the like that are obtained using the materials described in the publication. Further, it is also possible to use resins obtained using materials other than these materials. The alkali-soluble resins can be used singly or in combination of two or more types thereof.

As the acrylic copolymer resin, for example, one obtained by polymerizing a mixture of other monomers copolymerizable with an anionic group-containing monomer in a solvent in the presence of an ordinary radical generator (for example, benzoyl peroxide, tert-butyl peroxybenzoate, or azobisisobutyronitrile) can be used.

Examples of the anionic group-containing monomer include monomers having at least one type of anionic group selected from the group consisting of a carboxyl group, a sulfonic acid group, and a phosphonic acid group, and among these, monomers having a carboxyl group are particularly preferable.

Examples of the monomer having a carboxyl group include acrylic acid, methacrylic acid, crotonic acid, itaconic acid, maleic acid, fumaric acid, 2-carboxyethyl (meth)acrylate, 2-carboxypropyl (meth)acrylate, maleic anhydride, fumaric anhydride, and maleic acid half ester. Examples of the monomer having a sulfonic acid group include sulfoethyl methacrylate. Examples of the monomer having a phosphonic acid group include phosphonoethyl methacrylate.

As the other monomers copolymerizable with an anionic group-containing monomer, it is preferable to contain a hydrophobic group-containing monomer from the viewpoint of improving the adsorption on a pigment.

Examples of the hydrophobic group-containing monomer include, as a monomer having a long-chain alkyl group, alkyl esters having 8 or more carbon atoms of a radically polymerizable unsaturated carboxylic acid such as (meth)acrylic acid (for example, 2-ethylhexyl (meth)acrylate, octyl (meth)acrylate, lauryl (meth)acrylate, stearyl (meth)acrylate, 2-hydroxystearyl (meth)acrylate and the like), alkyl vinyl ethers having 8 or more carbon atoms (for example, dodecyl vinyl ether and the like), and vinyl esters of a fatty acid having 8 or more carbon atoms (for example, vinyl 2-ethylhexanoate, vinyl laurate, vinyl stearate and the like); as a monomer having an alicyclic hydrocarbon group, cyclohexyl (meth)acrylate and the like; and as a monomer having an aromatic hydrocarbon group, styrene-based monomers such as benzyl (meth)acrylate, styrene, α-methylstyrene, and vinyltoluene. The hydrophobic group-containing monomers can be used singly or in combination of two or more types thereof.

As the other monomers copolymerizable with an anionic group-containing monomer, a hydrophilic group-containing monomer can be contained from the viewpoint of suppressing aggregation of the alkali-soluble resin in an aqueous medium.

Examples of the hydrophilic group-containing monomer include, as a monomer having a (poly)oxyalkylene chain, esterified products of a (poly)alkylene glycol in which one terminal is capped with alkyl such as methoxy polyethylene glycol, methoxy polyethylene polypropylene glycol, ethoxy polyethylene glycol, ethoxy polyethylene polypropylene glycol, propoxy polyethylene glycol, and propoxy polyethylene polypropylene glycol, and a radically polymerizable unsaturated carboxylic acid such as (meth)acrylic acid, and ethylene oxide adducts and/or propylene oxide adducts of a radically polymerizable unsaturated carboxylic acid such as (meth)acrylic acid; as a basic group-containing monomer, vinylpyrrolidones such as 1-vinyl-2-pyrrolidone and 1-vinyl-3-pyrrolidone, vinylpyridines such as 2-vinylpyridine, 4-vinylpyridine, 5-methyl-2-vinylpyridine, and 5-ethyl-2-vinylpyridine, vinyl imidazoles such as 1-vinyl imidazole and 1-vinyl-2-methylimidazole, vinylpiperidines such as 3-vinylpiperidine and N-methyl-3-vinylpiperidine, nitrogen-containing derivatives of (meth)acrylic acid such as dimethylaminoethyl (meth)acrylate, diethylaminoethyl (meth)acrylate, tert-butylaminoethyl (meth)acrylate, (meth)acrylamide, N-methylol (meth)acrylamide, N-butoxymethyl (meth)acrylamide, N-methoxy (meth)acrylamide, N-ethoxy (meth)acrylamide, N-dimethylacrylamide, and N-propylacrylamide; as a monomer having a hydroxyl group, hydroxyalkyl esters of (meth)acrylic acid such as hydroxyethyl (meth)acrylate and hydroxypropyl (meth)acrylate; and as a monomer having an epoxy group, glycidyl (meth)acrylate. The hydrophilic group-containing monomers can be used singly or in combination of two or more types thereof.

Examples of the hydrophobic group-containing monomer and other copolymerizable monomers other than hydrophilic group-containing monomers include alkyl esters having less than 8 carbon atoms of (meth)acrylic acid, such as methyl (meth)acrylate, ethyl (meth)acrylate, propyl (meth)acrylate, isopropyl (meth)acrylate, butyl (meth)acrylate, and hexyl (meth)acrylate. The hydrophobic group-containing monomers and other copolymerizable monomers other than hydrophilic group-containing monomers can be used singly or in combination of two or more types thereof.

<Surfactant>

A surfactant can be used for the aqueous inkjet ink. As the surfactant, known surfactants used in aqueous inkjet inks can be used, and examples of the surfactant include nonionic surfactants, cationic surfactants, anionic surfactants, and betaine surfactants. Specific examples of the surfactant include silicone-based surfactants, fluorine-based surfactants, and acetylene-based surfactants. The surfactants can be used singly or in combination of two or more types thereof.

<Water-Soluble Solvent>

A water-soluble solvent can be used for the aqueous inkjet ink. As the water-soluble solvent, known water-soluble solvents used for an aqueous inkjet ink can be used, and examples of the water-soluble solvent include lower alcohols such as ethanol and propanol; polyhydric alcohols such as glycerin; (poly)alkylene glycols such as (poly)ethylene glycol and (poly)propylene glycol, and alkyl ethers thereof. The water-soluble solvents can be used singly or in combination of two or more types thereof.

Hereinafter, the proportion of each component in the aqueous inkjet ink will be described.

The proportion of the pigment in the aqueous inkjet ink of the present invention is preferably 1 mass % or more, more preferably 2 mass % or more from the viewpoint of improving the print density of a printed matter, and is preferably 10 mass % or less, more preferably 8 mass % or less from the viewpoint of improving ejection stability. However, when the pigment is a white pigment, the proportion of the white pigment in the aqueous inkjet ink of the present invention is preferably 4 mass % or more, more preferably 8 mass % or more, and is preferably 30 mass % or less, more preferably 20 mass % or less.

The content of the alkali-soluble resin is preferably 5 parts by mass or more, more preferably 15 parts by mass or more based on 100 parts by mass of the pigment from the viewpoint of increasing the dispersibility of the pigment. The content of the alkali-soluble resin is preferably 100 parts by mass or less, more preferably 80 parts by mass or less, and still more preferably 60 parts by mass or less based on 100 parts by mass of the pigment from the viewpoint of reducing the viscosity of the aqueous inkjet composition.

When the surfactant is used for the aqueous inkjet ink, the proportion of the surfactant in the aqueous inkjet ink is preferably 0.1 mass % or more, more preferably 0.5 mass % or more from the viewpoint of improving dot expandability and solid uniformity of a printed matter, and is preferably 3 mass % or less, more preferably 2 mass % or less from the viewpoint of improving storage stability.

When the water-soluble solvent is used for the aqueous inkjet ink, the proportion of the water-soluble solvent in the aqueous inkjet ink is preferably 15 mass % or more, more preferably 20 mass % or more from the viewpoint of improving ejection stability, and is preferably 60 mass % or less, more preferably 50 mass % or less from the viewpoint of improving the drying property of the coating film.

The proportion of the water in the aqueous inkjet ink is preferably 40 mass % or more, more preferably 50 mass % or more from the viewpoint of improving the drying property of the coating film, and is preferably 70 mass % or less, more preferably 60 mass % or less from the viewpoint of improving ejection stability.

<Basic Compound>

The aqueous inkjet ink preferably contains a basic compound from the viewpoint of dissolving the alkali-soluble resin. Examples of the basic compound include inorganic basic compounds such as sodium hydroxide and potassium hydroxide; and organic basic compounds such as ammonia, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine, and N-ethylmorpholine. The basic compounds can be used singly or in combination of two or more types thereof.

The proportion of the basic compound in the aqueous inkjet ink is only required to be an amount in which the alkali-soluble resin is dissolved in a medium, but is usually preferably 0.05 mass % or more, more preferably 0.1 mass % or more from the viewpoint of increasing the dispersion stability of the alkali-soluble resin, and is preferably 1 mass % or less, more preferably 0.5 mass % or less from the viewpoint of increasing the water resistance of a printed matter.

Additives such as a known resin, a resin emulsion, a wax emulsion, a pigment dispersant, a mildewproofing agent, a rust inhibitor, a thickener, an antioxidant, an ultraviolet absorber, a preservability improver, an antifoaming agent, and a pH adjuster can be further added to the aqueous inkjet ink depending on the purpose.

<Method for Preparing Aqueous Inkjet Ink>

The method for preparing (producing) the aqueous inkjet ink is not particularly limited, and the above-described components can be added in order or simultaneously and mixed. Examples thereof include method 1) in which an aqueous resin varnish in which an alkali-soluble resin is dissolved in water in the presence of the basic compound, a pigment, and if necessary, a pigment dispersant and the like are mixed, then a pigment dispersion (ink base) is prepared using various dispersers such as a ball mill, an attritor, a roll mill, a sand mill, and an agitator mill, and the remaining materials are further added to prepare an aqueous inkjet ink; and method (2) in which a pigment is dispersed by the above-described method, then a resin-coated pigment in which an alkali-soluble resin is deposited on a pigment surface is obtained by, for example, an acid deposition method or an ion exchange method described in Republished patent WO 2005/116147, then the obtained resin-coated pigment is neutralized with a basic compound and redispersed in water using various dispersers (such as a high-speed stirrer), and the remaining materials are further added to prepare an aqueous inkjet ink.

The initial viscosity of the aqueous inkjet ink after production is 2.0 to 15.0 mPa·s, preferably in a range of 3.0 to 12.0 mPa·s at 25° C. The viscosity can be measured with, for example, an E-type viscometer (trade name "RE100L type viscometer" manufactured by Toki Sangyo Co., Ltd.).

<Cleaning Method>

The cleaning method of the present invention is a method for supplying a cleaning fluid to a portion to which an aqueous inkjet ink to be ejected adheres in an inkjet printer that ejects the aqueous inkjet ink containing a pigment and an alkali-soluble resin. The cleaning fluid may be separately supplied to the portion to which the aqueous inkjet ink adheres, or may be supplied in a state of being mixed in advance to the portion to which the aqueous inkjet ink adheres.

Further, a nozzle plate having a plurality of ejection ports for ejecting ink is usually provided at a portion where the aqueous inkjet ink is ejected in the inkjet printer. The cleaning fluid of the present invention does not erode the silicon nozzle plate, and thus is suitable for such an inkjet printer having a silicon nozzle plate.

EXAMPLES

Hereinafter, the present invention will be described with reference to Examples and the like, but the present invention is not limited thereto.

Production Example 1

<Production of Pigment Dispersion (Black Ink Base)>

An alkali-soluble resin (acrylic acid/n-butyl acrylate/benzyl methacrylate/styrene copolymer), weight average molecular weight: 30,000, acid value: 185 mg KOH/g, glass transition temperature: 40° C.) (20 parts by mass) was dissolved in a mixed solution of 2.5 parts by mass of potassium hydroxide and 77.5 parts by mass of water to obtain an aqueous resin varnish having a solid content of the alkali-soluble resin of 20 mass %. Then, 64.3 parts by mass of water was added to and mixed with 23.7 parts by mass of the aqueous resin varnish to prepare a resin varnish for pigment dispersion. To this resin varnish for pigment dispersion, 12 parts by mass of carbon black (trade name: "Printex 90", manufactured by Degussa AG) as a pigment was further added. The mixture was stirred and mixed and then milled with a wet circulation mill to produce a black pigment dispersion (black ink base).

<Preparation of Aqueous Inkjet Ink>

To 34 parts by mass of the black pigment dispersion were added 30 parts by mass of water, 35 parts by mass of propylene glycol, and 1 part by mass of an acetylene-based surfactant (trade name "SURFYNOL 465"), and the mixture was stirred and mixed to prepare an aqueous inkjet ink.

Examples 1 to 13 and Comparative Examples 1 to 11

<Preparation of Cleaning Fluid>

In Examples and Comparative Examples, according to the formulations shown in Tables 1 and 2, raw materials were charged into a beaker and stirred and mixed with a stirring device to prepare cleaning fluids of Examples and Comparative Examples. The pH of the cleaning fluid of Examples was 6.5 to 8.5, and the viscosity at 25° C. was about 1.0 to 1.8 cps.

Using the aqueous inkjet ink and the cleaning fluids obtained above, evaluation was performed by the following method. The results are shown in Tables 1 and 2.

<Storage Stability>

Each of the cleaning fluid obtained above was placed in a glass bottle, and the viscosity (mPa·s) at 25° C. was measured with a viscometer ("RE100L type" manufactured by Toki Sangyo Co., Ltd.). Then, the glass bottle was tightly stopped and stored at 60° C. for 1 month, and the viscosity (25° C.) after storage was measured with a viscometer. The storage stability was evaluated by the rate of viscosity change (60° C., (viscosity after 1 month−viscosity before storage)/viscosity before storage).

[Evaluation Criteria]

○: Rate of viscosity change is less than 5%.

Δ: Rate of viscosity change is 5% or more and less than 10%.

X: Additives are separated and non-uniform.

<Antiseptic Effect>

Bacteria evaluation: A bacterial culture solution (0.6 g) cultured using an ordinary agar medium was inoculated, mixed with 30 g of the cleaning fluid obtained above in a petri dish, and cultured at 30° C. for 7 days.

Mold and yeast evaluation: A mold-yeast suspension (0.6 g) cultured using a potato dextrose agar medium was inoculated, mixed with 30 g of the cleaning fluid obtained above in a petri dish, and cultured at 28° C. for 7 days.

Thereafter, the residual state of microorganisms in each petri dish was evaluated.

[Evaluation Criteria]

◯: No growth of microorganisms is observed in any petri dish.

Δ: The number of colonies is less than 10 in all petri dishes.

X: The number of colonies in at least one petri dish is 10 or more.

<Cleaning Property for Aqueous Inkjet Ink>

The aqueous inkjet ink was filled in an inkjet printer PX-105 (manufactured by Seiko Epson Corporation), solid printing was continuously performed on 10 sheets of A4 size paper to confirm that the ink was filled. Then, the ink was left in an oven at 50° C. for 3 months in a state where the recording head was filled with the ink. When the nozzle check printing was performed after leaving, a plurality of nozzles in which ink ejection failure occurred were confirmed (misfiring). The recording head was filled with the cleaning fluid obtained above in the initial filling mode, and the cleaning property for the aqueous inkjet ink was evaluated.

[Evaluation Criteria]

◯: All the nozzles are recovered only by the initial filling sequence, and the ejection failure is improved.

Δ: All the nozzles are recovered by one to three times of the cleaning operation, and the ejection failure is improved.

X: Even when the cleaning operation is performed three or more times, misfiring occurs, and the ejection failure is not improved.

<Erosion of Silicon Nozzle Plate>

A 2 cm×2 cm silicon nozzle plate was immersed in the cleaning fluid obtained above, and this was stored at 60° C. for 1 month. Then, the liquid repellency of the nozzle plate after storage was evaluated by the contact angle of water.

[Evaluation Criteria]

◯: The contact angle of water is 90° or more.

Δ: The contact angle of water is 80° or more and less than 90°.

X: The contact angle of water is less than 80°.

TABLE 1

|  | Example 1 | Example 2 | Example 3 | Example 4 | Example 5 | Example 6 | Example 7 |
|---|---|---|---|---|---|---|---|
| Purified water | 99.34 | 99.19 | 99.44 | 99.33 | 99.34 | 79.33 | 79.33 |
| Propylene glycol |  |  |  |  |  | 20.00 |  |
| Diethylene glycol |  |  |  |  |  |  | 20.00 |
| Glycerin |  |  |  |  |  |  |  |
| EMULGEN 1150S-60 (HLB19) |  |  |  |  |  |  |  |
| RHEODOL TW-L120 (HLB17) |  |  |  |  |  |  |  |
| NYMEEN S-220 (HLB15) |  |  |  |  |  |  |  |
| SURFYNOL 465 (HLB13) | 0.50 | 0.50 | 0.50 | 0.50 | 0.50 | 0.50 | 0.50 |
| KF-355A (HLB12) |  |  |  |  |  |  |  |
| DOWSI FZ-2104 Fluid (HLB9) |  |  |  |  |  |  |  |
| SURFYNOL 440 (HLB8) |  |  |  |  |  |  |  |
| UNISAFE 10P-8 (HLB8) |  |  |  |  |  |  |  |
| KF-352A (HLB7) |  |  |  |  |  |  |  |
| DMDMH | 0.15 | 0.30 | 0.05 | 0.15 | 0.15 | 0.15 | 0.15 |
| Iodopropynyl butylcarbamate |  |  |  | 0.01 | 0.01 | 0.01 | 0.01 |
| PROXEL GXL |  |  |  |  |  |  |  |
| Sodium pyrithione |  |  |  |  |  |  |  |
| Potassium hydroxide | 0.01 | 0.01 | 0.01 | 0.01 |  | 0.01 | 0.01 |
| Storage stability | ◯ | Δ | ◯ | ◯ | ◯ | ◯ | ◯ |
| Antiseptic effect | Δ | ◯ | Δ | ◯ | ◯ | ◯ | ◯ |
| Cleaning property | ◯ | ◯ | ◯ | ◯ | ◯ | ◯ | ◯ |
| Erosion | ◯ | ◯ | ◯ | ◯ | ◯ | ◯ | ◯ |

|  | Example 8 | Example 9 | Example 10 | Example 11 | Example 12 | Example 13 |
|---|---|---|---|---|---|---|
| Purified water | 79.33 | 99.33 | 99.33 | 99.33 | 99.33 | 99.73 |
| Propylene glycol |  |  |  |  |  |  |
| Diethylene glycol |  |  |  |  |  |  |
| Glycerin | 20.00 |  |  |  |  |  |
| EMULGEN 1150S-60 (HLB19) |  | 0.50 |  |  |  |  |
| RHEODOL TW-L120 (HLB17) |  |  | 0.50 |  |  |  |
| NYMEEN S-220 (HLB15) |  |  |  | 0.50 |  |  |
| SURFYNOL 465 (HLB13) | 0.50 |  |  |  |  |  |
| KF-355A (HLB12) |  |  |  |  | 0.50 |  |
| DOWSI FZ-2104 Fluid (HLB9) |  |  |  |  |  | 0.10 |
| SURFYNOL 440 (HLB8) |  |  |  |  |  |  |
| UNISAFE 10P-8 (HLB8) |  |  |  |  |  |  |
| KF-352A (HLB7) |  |  |  |  |  |  |
| DMDMH | 0.15 | 0.15 | 0.15 | 0.15 | 0.15 | 0.15 |
| Iodopropynyl butylcarbamate | 0.01 | 0.01 | 0.01 | 0.01 | 0.01 | 0.01 |
| PROXEL GXL |  |  |  |  |  |  |
| Sodium pyrithione |  |  |  |  |  |  |
| Potassium hydroxide | 0.01 | 0.01 | 0.01 | 0.01 | 0.01 | 0.01 |
| Storage stability | ◯ | ◯ | ◯ | ◯ | ◯ | ◯ |
| Antiseptic effect | ◯ | ◯ | ◯ | ◯ | ◯ | ◯ |
| Cleaning property | ◯ | ◯ | ◯ | ◯ | ◯ | ◯ |
| Erosion | ◯ | ◯ | ◯ | ◯ | ◯ | ◯ |

TABLE 2

| | Comparative Example 1 | Comparative Example 2 | Comparative Example 3 | Comparative Example 4 | Comparative Example 5 | Comparative Example 6 |
|---|---|---|---|---|---|---|
| Purified water | 98.99 | 99.48 | 99.46 | 99.47 | 99.38 | 99.39 |
| Propylene glycol | | | | | | |
| Diethylene glycol | | | | | | |
| Glycerin | | | | | | |
| EMULGEN 1150S-60 (HLB19) | | | | | | |
| RHEODOL TW-L120 (HLB17) | | | | | | |
| NYMEEN S-220 (HLB15) | | | | | | |
| SURFYNOL 465 (HLB13) | 0.50 | 0.50 | 0.50 | 0.50 | 0.50 | 0.50 |
| KF-355A (HLB12) | | | | | | |
| DOWSI FZ-2104 Fluid (HLB9) | | | | | | |
| SURFYNOL 440 (HLB8) | | | | | | |
| UNISAFE 10P-8 (HLB8) | | | | | | |
| KF-352A (HLB7) | | | | | | |
| DMDMH | 0.50 | 0.01 | 0.01 | | 0.01 | |
| Iodopropynyl butylcarbamate | | | 0.02 | 0.02 | | |
| PROXEL GXL | | | | | 0.10 | 0.10 |
| Sodium pyrithione | | | | | | |
| Potassium hydroxide | 0.01 | 0.01 | 0.01 | 0.01 | 0.01 | 0.01 |
| Storage stability | x | ○ | ○ | ○ | ○ | ○ |
| Antiseptic effect | ○ | x | x | x | ○ | ○ |
| Cleaning property | Δ | ○ | ○ | ○ | ○ | ○ |
| Erosion | ○ | ○ | ○ | ○ | x | x |

| | Comparative Example 7 | Comparative Example 8 | Comparative Example 9 | Comparative Example 10 | Comparative Example 11 |
|---|---|---|---|---|---|
| Purified water | 99.38 | 99.39 | 99.73 | 99.73 | 99.73 |
| Propylene glycol | | | | | |
| Diethylene glycol | | | | | |
| Glycerin | | | | | |
| EMULGEN 1150S-60 (HLB19) | | | | | |
| RHEODOL TW-L120 (HLB17) | | | | | |
| NYMEEN S-220 (HLB15) | | | | | |
| SURFYNOL 465 (HLB13) | 0.50 | 0.50 | | | |
| KF-355A (HLB12) | | | | | |
| DOWSI FZ-2104 Fluid (HLB9) | | | | | |
| SURFYNOL 440 (HLB8) | | | 0.10 | | |
| UNISAFE 10P-8 (HLB8) | | | | 0.10 | |
| KF-352A (HLB7) | | | | | 0.10 |
| DMDMH | 0.01 | | 0.15 | 0.15 | 0.15 |
| Iodopropynyl butylcarbamate | | | 0.01 | 0.01 | 0.01 |
| PROXEL GXL | | | | | |
| Sodium pyrithione | 0.10 | 0.10 | | | |
| Potassium hydroxide | 0.01 | 0.01 | 0.01 | 0.01 | 0.01 |
| Storage stability | ○ | ○ | x | x | x |
| Antiseptic effect | ○ | ○ | ○ | ○ | ○ |
| Cleaning property | ○ | ○ | Δ | Δ | Δ |
| Erosion | x | x | ○ | ○ | ○ |

In Tables 1 and 2, EMULGEN 1150S-60 is polyoxyethylene alkyl ether (HLB 19, manufactured by Kao Corporation);

RHEODOL TW-L120 is polyoxyethylene sorbitan monolaurate (HLB 17, manufactured by Kao Corporation);

NYMEEN S-220 is polyoxyethylene stearylamine (HLB 15, manufactured by NOF Corporation);

SURFYNOL 465 is polyoxyethylene acetylenic glycol ether (HLB 13, manufactured by Evonik Industries AG);

KF-355A is polyether-modified silicon (HLB 12, manufactured by Shin-Etsu Chemical Co., Ltd.);

DOWSI FZ-2104 Fluid is polyether-modified silicon (HLB 9, manufactured by The Dow Chemical Company);

SURFYNOL 440 is polyoxyethylene acetylenic glycol ether, (HLB 8, manufactured by Evonik Industries AG);

UNISAFE 10P-8 is polyoxyethylene polyoxypropylene cetyl ether (HLB 8, manufactured by NOF Corporation);

KF-352A is polyether-modified silicon (HLB 7, manufactured by Shin-Etsu Chemical Co., Ltd.);

DMDMH is 1,3-bis(2-hydroxyethyl)-5,5-dimethyl-2,4-imidazolidinedione; and

PROXEL GXL is a composition containing 20 mass % of 1,2-benzisothiazolin-3-one (manufactured by Lonza).

What is claimed is:

1. A cleaning fluid used in an inkjet printer that ejects an aqueous inkjet ink containing a pigment and an alkali-soluble resin, and used for cleaning a portion of the inkjet printer to which the aqueous inkjet ink to be ejected adheres, the cleaning fluid comprising:
   a surfactant;
   an antiseptic; and
   water,
   wherein the surfactant is a compound having a polyoxyalkylene skeleton and having an HLB of 9 to 20,
   the antiseptic contains a compound having a hydantoin skeleton, and
   a proportion of the compound having a hydantoin skeleton in the cleaning fluid is 0.05 to 0.3 mass %.

2. The cleaning fluid according to claim 1, further comprising one or more types of moisturizers selected from the group consisting of a polyalkylene glycol, an alkylene glycol, and glycerin.

3. The cleaning fluid according to claim 1, further comprising a pH adjuster.

4. The cleaning fluid according to claim 1, wherein the compound having a hydantoin skeleton is 1,3-bis(2-hydroxyethyl)-5,5-dimethyl-2,4-imidazolidinedione.

5. The cleaning fluid according to claim 1, further comprising, as the antiseptic, an antiseptic other than the compound having a hydantoin skeleton.

6. An ink set comprising:
   the cleaning fluid according to claim 1; and
   an aqueous inkjet ink containing a pigment and an alkali-soluble resin.

7. A cleaning method comprising, in an inkjet printer that ejects an aqueous inkjet ink containing a pigment and an alkali-soluble resin, supplying the cleaning fluid according to claim 1 to a portion to which the aqueous inkjet ink to be ejected adheres.

* * * * *